(12) United States Patent
Rácz et al.

(10) Patent No.: US 12,214,499 B2
(45) Date of Patent: Feb. 4, 2025

(54) TECHNIQUE FOR PARAMETER CONVERSION BETWEEN A ROBOTIC DEVICE AND A CONTROLLER FOR THE ROBOTIC DEVICE

(71) Applicant: Telefonaktiebolaget LM Ericsson (PUBL), Stockholm (SE)

(72) Inventors: Sándor Rácz, Cegléd (HU); Géza Szabó, Kecskemét (HU); Attila Báder, Paty (HU)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 423 days.

(21) Appl. No.: 17/595,223

(22) PCT Filed: May 17, 2019

(86) PCT No.: PCT/EP2019/062858
§ 371 (c)(1),
(2) Date: Nov. 11, 2021

(87) PCT Pub. No.: WO2020/233777
PCT Pub. Date: Nov. 26, 2020

(65) Prior Publication Data
US 2022/0219322 A1 Jul. 14, 2022

(51) Int. Cl.
*B25J 9/16* (2006.01)

(52) U.S. Cl.
CPC ........... *B25J 9/1653* (2013.01); *B25J 9/1692* (2013.01)

(58) Field of Classification Search
CPC .................. B25J 9/1653; B25J 9/1692; G05B 2219/39056; G05B 2219/39295
See application file for complete search history.

(56) References Cited

U.S. PATENT DOCUMENTS 8,688,398 B2 * 4/2014 Sakhare ............ H01L 21/67742
702/95
2015/0375396 A1 * 12/2015 Shirakyan .............. B25J 9/1692
700/254
(Continued)

FOREIGN PATENT DOCUMENTS

CN 111791231 A * 10/2020 ............ B25J 9/1653
DE 4110741 A1 * 12/1991 ............... G07C 3/14
(Continued)

OTHER PUBLICATIONS

DE-102016012227-A1 translation (Year: 2017).*
(Continued)

*Primary Examiner* — Kyle T Johnson
(74) *Attorney, Agent, or Firm* — Baker Botts L.L.P.

(57) ABSTRACT

An apparatus for parameter transformation between a robotic device and a controller for the robotic device is presented. The apparatus is configured to receive at least one non-transformed parameter indicative of at least one of a position and a velocity of or for the robotic device, wherein the non-transformed parameter is received from the robotic device or the controller, respectively. The apparatus is further configured to transform the received non-transformed parameter to a transformed parameter using a transformation between an ideal parameter domain of the controller and a real parameter domain of the robotic device, the ideal parameter domain including ideal parameters processable by the controller and the real parameter domain including real parameters measurable at the robotic device and capable of deviating from the associated ideal parameters. The apparatus is further configured to transmit the transformed parameter to the other one of the robotic device and the controller, A method, a system, a computer-program product and a cloud computing system for parameter transformation are presented also.

17 Claims, 5 Drawing Sheets

(56) References Cited

U.S. PATENT DOCUMENTS

| | | | | |
|---|---|---|---|---|
| 2016/0231728 A1* | 8/2016 | Munz | ................... | G05B 19/402 |
| 2016/0288332 A1* | 10/2016 | Motoyoshi | ............. | B25J 13/085 |
| 2016/0346932 A1* | 12/2016 | Deng | ................... | B25J 9/1692 |
| 2017/0090459 A1* | 3/2017 | Koga | ................... | G06N 20/00 |
| 2017/0372229 A1* | 12/2017 | Ura | ........................ | G06N 20/00 |
| 2018/0126553 A1* | 5/2018 | Corkum | ................ | B25J 9/1697 |
| 2018/0154523 A1* | 6/2018 | Jeong | .................... | B25J 19/021 |
| 2020/0147799 A1* | 5/2020 | Yamaoka | ............... | B25J 9/1692 |
| 2021/0342683 A1* | 11/2021 | Baker | .................... | G06N 3/047 |
| 2022/0168896 A1* | 6/2022 | Liang | .................... | B25J 9/1692 |
| 2022/0203520 A1* | 6/2022 | Motoyoshi | ......... | G05B 19/4155 |
| 2022/0219322 A1* | 7/2022 | Rácz | ..................... | B25J 9/1653 |

FOREIGN PATENT DOCUMENTS

| | | | | |
|---|---|---|---|---|
| DE | 102016012227 A1 * | 4/2017 | | |
| KR | 970005616 B1 * | 4/1997 | ................ | B25J 9/10 |

OTHER PUBLICATIONS

CN-111791231-A translation (Year: 2020).*
DE-4110741-A1 translation (Year: 1991).*
KR-970005616-B1 translation (Year: 1997).*
Neuro-Accuracy Compensator for Industrial Robots by X.L. Zhong et al.—Jun. 27, 1994.
PCT International Search Report issued for International application No. PCT/EP2019/062858—Feb. 18, 2020.
PCT Written Opinion of the International Searching Authority issued for International application No. PCT/EP2019/062858—Feb. 18, 2020.

* cited by examiner

TECHNIQUE FOR PARAMETER CONVERSION BETWEEN A ROBOTIC DEVICE AND A CONTROLLER FOR THE ROBOTIC DEVICE

PRIORITY

This nonprovisional application is a U.S. National Stage Filing under 35 U.S.C. § 371 of International Patent Application Serial No. PCT/EP2019/062858 filed May 17, 2019 and entitled "Technique for Parameter Conversion Between a Robotic Device and a Controller for the Robotic Device", which is hereby incorporated by reference in its entirety.

TECHNICAL FIELD

The present disclosure generally relates to industrial automation. In particular, a technique for parameter transformation between a robotic device and a controller for the robotic device is presented. The technique may be implemented in the form of devices, methods, systems, computer program products and computing clouds.

BACKGROUND

In industrial automation, there is a trend to build robot cells from multiple robotic devices (such as collaborative robot arms) and to control these robotic devices remotely. In factories, production lines are designed for producing specific products. A robot cell in such a production line is designed and optimized for its specific task (e.g., producing car parts or machine components). These tailor-made robotic cells are typically used for months or even for years without reconfigurations. At installation time, devices (e.g., robot arms) are precisely installed to achieve the required positional accuracy.

Nowadays, two solutions exist to achieve the required positional accuracy. Either the robotic device (e.g., a robotic arm) is mounted very accurately or a complete kinematical model of the geometric structure of the robot cell is developed. The parameters of the kinematical model can then be calculated by mathematical optimization based on measured data. A controller for the robotic device performs calibration and subsequent control of the robotic device based on an ideal kinematical model and assuming ideal mounting of the robotic device. Once the calibration is done, the configuration of the controller is adjusted accordingly.

Prior art can be found, for example, in U.S. Pat. No. 4,806,066 which relates to a mechanical solution to improve the accuracy of robotic arms, U.S. Pat. No. 8,688,398 B2 which describes a calibration method for robotic arms using a specific calibration device and U.S. Pat. No. 6,070,109 which discloses an automatic calibration method for robotic arms using known reference points.

The existing solutions for achieving operational accuracy of robotic devices are time-consuming, as many parameters of the robotic devices need to be fine-tuned. On the other hand, modern robotic devices can be used for different tasks, and there is a tendency to reconfigure robotic devices more frequently (e.g., on a weekly or even daily basis). Consequently, the existing solutions for achieving operational accuracy of robotic devices are no longer efficient.

SUMMARY

There is a need for a technique that permits a time-efficient configuration or reconfiguration of robotic devices and that still enables a high operational accuracy.

According to a first aspect, an apparatus for parameter transformation between a robotic device and a controller for the robotic device is presented. The apparatus is configured to receive at least one non-transformed parameter indicative of at least one of a position and a velocity of or for the robotic device, wherein the non-transformed parameter is received from one of the robotic device and the controller, respectively. The apparatus is further configured to transform the received non-transformed parameter to a transformed parameter using a transformation between an ideal parameter domain of the controller and a real parameter domain of the robotic device, the ideal parameter domain including ideal parameters processable by the controller and the real parameter domain including real parameters measurable at the robotic device and capable of deviating from the associated ideal parameters. The apparatus is further configured to transmit the transformed parameter to the other one of the robotic device and the controller.

The robotic device may be a robot actuator (such as a robot arm), an automated guided vehicle, and so on. Each robotic device may comprise one or more individually controllable entities (e.g., actuators such as joints). The controller for the robotic device may be configured to send command messages to and receive status messages from the robotic device (e.g., via a wired or wireless transmission). It may further be configured to control one or more individually controllable entities of the robotic device to execute a control command generated by the controller and transmitted in a command message to the robotic device (e.g., to move a robot arm within multiple degrees of freedom based on that control command). The control command may generated based on status information (e.g., regarding the current status of an individually controllable entity) received in a status message from the robotic device.

The controller may be located in a computing-cloud. Communication between the controller and the robotic device may occur across a wireless communication network. The wireless communication network may be a so-called $5^{th}$ Generation (5G) communication network.

Commands messages sent from the controller to the robotic device may contain at least one of a position and a velocity for the robotic device necessary to execute the control command. For example, the robotic device may be controlled to move to its initial position after an operation step is completed. The parameters sent from the controller to the robotic device may be ideal parameters, such as position and/or velocity values generated based on an assumed ideal deployment of the robotic device and/or an assumed ideal geometry of the robot cell. The processing of the content of status messages and of the content of command messages by the controller may be based on the ideal parameters.

The status messages sent from the robotic device to the controller may contain at least one of a position and a velocity of the robotic device. For example, the robotic device may transmit to the controller its current status, such as its real position and/or real velocity as measured at or by the robotic device. Said real parameters may deviate from associated ideal parameters of the controller. The processing of the content of status messages and of the content of command messages by the robotic device may be based on the real parameters.

As mentioned above, for controlling the robotic device an ideal deployment of the robotic device may be assumed by the controller. That is, in order to control the robotic device, the controller processes ideal parameters as input and/or output. On the other hand, operation of the robotic device is based on real parameters, i.e., the robotic device implements the commands received from the controller in real parameters as input and/or creates status messages containing real parameters as output.

In some variants, the controller may control two or more robotic devices in a robot cell. The robotic devices may collaboratively work together on the same object. In this case, each of the robotic devices may send status messages comprising real parameters to the controller and may receive command messages comprising ideal parameters from the controller.

The transformation as such may be obtained from a machine learning algorithm. The machine learning algorithm may for example be a neural network or any other modeling algorithm configured to learn from training data. The machine learning algorithm may be trained to recognize specific patterns in the training data and/or to choose a specific transformation, e.g., based on a mathematical optimization procedure.

An input for training the machine learning algorithm to obtain the transformation may be at least one of a transformation previously outputted by the machine learning algorithm and a deviation between a real parameter and an associated ideal parameter. For example, the machine learning algorithm may compare the deviation between the real parameter and the associated ideal parameter to deviations between real and ideal parameters previously received and may configure the transformation to correspond to the most similar deviation according to a similarity criterion. Alternatively or additionally, the machine learning algorithm may modify a previous transformation based on the deviation between the real parameter (e.g., a position or velocity value as measured at or actually implemented by the robotic device) and the associated ideal parameter (e.g., the associated position or velocity value as input to/output by the controller).

An initial real parameter for training the machine learning algorithm may be derived by moving the robotic device to a predefined position. Additionally, or in the alternative, an initial ideal parameter for training the machine learning algorithm may be derived by instructing the controller to move the robotic device to the same predefined position. In some variants, the reference point of a tool center of a robotic arm of the robotic device may be moved to the predefined position, i.e., only a part of the robotic device is moved to the predefined position. In other variants, the entire robotic device may be moved to a different location inside a robot cell, representing the predefined position (e.g., along a rail structure). In the second case, the ideal parameters may be obtained from a kinematic model of the entire robot cell stored in the controller.

The transformation may be representative of an adjustment of a deviation between a real parameter and an associated ideal parameter. The transformation may be configured to adjust a deviation between an ideal position and an associated real position. Alternatively, or in addition, the transformation may be configured to adjust a deviation between an ideal velocity and a real velocity.

In some variants, the transformation may depend on at least one of an ideal parameter, a real parameter and an update time of the controller. The update time of the controller may for example be the time difference between two consecutive command messages generated by or received from the controller. For example, in case of a deviation between a real position and an ideal position, the transformation may depend on a difference between the real position and the ideal position. As a further example, the transformation between an ideal velocity and a real velocity may depend on the product of the ideal velocity and the update time of the controller and/or a ratio of an ideal position and the update time of the controller.

The received non-transformed parameter may be one of a real parameter received from the robotic device and an ideal parameter received from the controller. The transmitted transformed parameter may be one of a real parameter transmitted to the robotic device and an ideal parameter transmitted to the controller. As such, the apparatus according to the present disclosure may be configured to transform parameters sent from the robotic device to the controller and vice versa.

The non-transformed parameter may be contained in one of a command message for the robotic device received from the controller and a status message for the controller received from the robotic device. Further, the transformed parameter may be contained in one of a command message transmitted to the robotic device from the controller and a status message transmitted to the controller from the robotic device. The command message may comprise further information, such as a specific tool to be used by the robotic device or a specific rotational speed of a tool of the robotic device. The status message may comprise further information, such as a current temperature at a tip of a tool of the robotic device or a current pressure of a hydraulic fluid inside the robotic device.

The transformation may be configured to be updated responsive to a reconfiguration of the robotic device. The reconfiguration may be necessary, for example, when the robotic device is newly calibrated for performing a different task, such as producing another product. The reconfiguration may further be necessary for example when the rejection rate of the robotic device has to be adjusted, such as when the number of waste parts produced by the robotic device needs to be lowered. As a further example, the robotic device may need to be reconfigured for cooperative use-cases, where several robotic devices work on the same object. The reconfiguration may comprise at least one of a change in a movement path performed by the robotic device, a change in a degree of precision of a movement path performed by the robotic device and a change in a location of the robotic device.

According to a second aspect, a network analytics system is presented. The network analytics system is configured to be located between a robotic device and a controller for the robotic device, the network analytics system comprising the apparatus presented herein.

In some variants, the network analytics system is configured to monitor an operational performance of the robotic device and to obtain (e.g., train) a new transformation in case of a decrease in operational performance. Operational performance may be determined in various ways, such as the time to reach a predefined position or velocity, the rejection rate, and so on. The decrease in operational performance may be determined using a thresholding decision.

According to a third aspect, a parameter transformation system comprising the apparatus presented herein is presented, wherein the transformation is obtained from a machine learning algorithm. The parameter transformation system further comprises a computing cloud-based training module for the machine learning algorithm.

In some variants, the machine learning algorithm is trained in the cloud-based training module. The transformation may be transmitted from the computing cloud-based training module to the apparatus. The computing cloud-based training module and the apparatus may form part of a network analytics system.

According to a fourth aspect, a method for parameter transformation between a robotic device and a controller for the robotic device is presented. The method comprises receiving at least one non-transformed parameter indicative of at least one of a position and a velocity of or for the robotic device, wherein the non-transformed parameter is received from the robotic device or the controller, respectively. The method further comprises transforming the received non-transformed parameter to a transformed parameter using a transformation between an ideal parameter domain of the controller and a real parameter domain of the robotic device, the ideal parameter domain including ideal parameters processable by the controller and the real parameter domain including real parameters measurable at the robotic device and capable of deviating from the associated ideal parameters. The method further comprises transmitting the transformed parameter to the other one of the robotic device and the controller.

In some variants, the method may further comprise the step of storing at least one non-transformed parameter, at least one associated transformed parameter and a corresponding transformation. The stored parameters and/or the stored transformation may be used as input to train a machine learning algorithm for outputting a new transformation as presented herein.

The method may be performed by the apparatus presented herein. In some cases, the apparatus may comprise a storage module for storing parameters and transformations.

Also provided is a computer program product comprising program code portions for performing the steps of any of the method aspects presented herein when executed by one or more processors. The computer program product may be stored on a computer-readable recording medium. The computer program product may also be provided for download via a network connection.

Also presented is a cloud computing system configured to perform any of the method aspects presented herein. The cloud computing system may comprise distributed cloud computing resources that jointly perform the method aspects presented herein.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
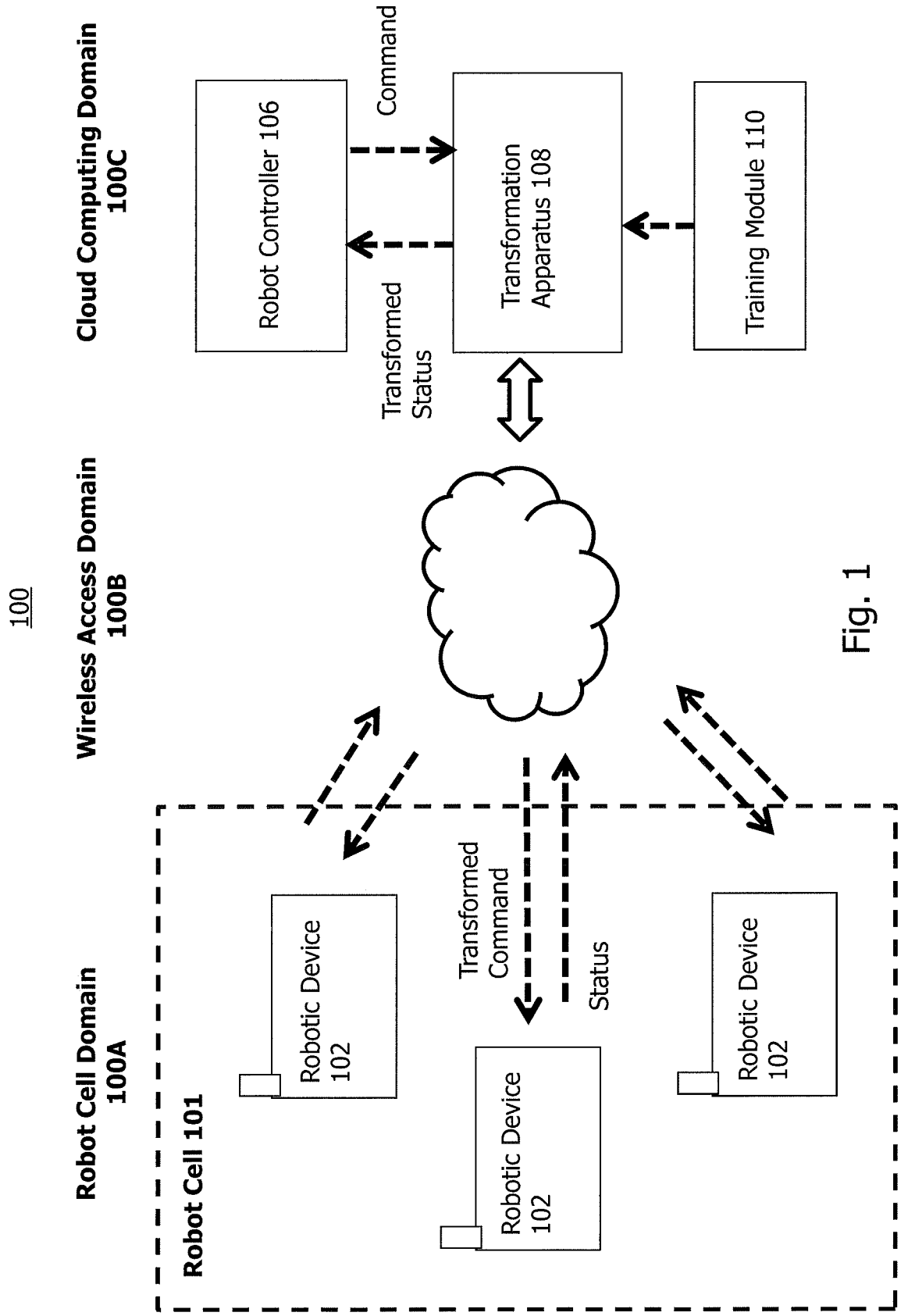
FIG. 1 illustrates a network system embodiment of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on specific radio access network types, such as 5G networks, for a wireless communication between a robotic device and its controller, the present disclosure can also be implemented in connection with other wired or wireless communication techniques. Moreover, while certain aspects in the following description will exemplarily be described in connection with cellular networks, particularly as standardized by the $3^{rd}$ Generation Partnership Project (3GPP), the present disclosure is not restricted to any specific cellular access type.

Those skilled in the art will further appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same components.

FIG. 1 illustrates an embodiment of a network system 100 implementing a computing cloud-based robot cell control. As shown in FIG. 1, the network system 100 comprises a robot cell domain 100A, a wireless access domain 100B as well as a cloud computing domain 100C.

The robot cell domain 100A comprises at least one robot cell 101 with multiple robotic devices 102. The robotic devices 102 can be or include various actuators such as robot arms movable within various degrees of freedom. The various robotic devices 102 within the robot cell 101 may collaboratively work on the same task (e.g., on the same work product).

The wireless access domain 100B may be a cellular or non-cellular network, such as a cellular 5G network as specified by 3GPP. The wireless access domain 100B may comprise a base station or a wireless access point (not shown) that enables a wireless communication between components of the robot cell 101 on the one hand and the cloud computing domain 100C on the other via the wireless access domain 100B. Further, it is to be understood that the wireless access domain 100B is only depicted for exemplary purposes. The technique presented herein is not limited to wireless signal transmission between the robot cell domain 100A and the cloud computing domain 100C. Any other way of transmitting data between two domains of a network can be likewise applied in the presented technique.

As illustrated in FIG. 1A the robotic devices 102 are configured to receive command messages generated in the cloud computing domain 100C via wireless transmissions from the wireless access domain 100B. Moreover, status messages containing the current status of the robotic device 102 are wirelessly communicated via the wireless access domain 100B to the cloud computing domain 100C. Processing of the status messages (e.g., in the context of inverse kinematics) at least partially takes place in the cloud computing domain 100C. The processed status messages may then form the basis for command message generation in the cloud computing domain 100C. Additionally, or in the alternative, command message generation in the cloud computing domain 100C is based on actions defined in an action plan for one or more of the robotic devices 102.

The cloud computing domain 100C comprises a controller 106 for the robotic device 102. The controller 106 is composed of cloud computing resources. The controller 106 is configured to receive the status messages from the robotic devices 102 via the wireless access domain 100B. The controller 106 is further configured to process these status messages and, in some variants, to forward the processed status messages as new command messages to the wireless access domain 100B for distribution to the individual robotic devices 102.

For controlling the robotic devices 102, the controller 106 assumes an ideal deployment of the robotic devices 102, based on a calibration model of the robotic device 102. In other words, the controller 106 processes ideal parameters, i.e., parameters representing an assumed ideal status of the robotic device 102. On the other hand, the robotic devices 102 generate status messages containing real parameters, i.e., parameters representing the actual status of a particular robotic device 102. These real parameters in the robot cell domain 100A of the robotic device 102 may deviate from the associated ideal parameters processed by the controller 106 in the cloud computing domain 100C. The deviations may have various causes, such as unintended positional shifts of the robotic devices 102, intended reconfiguration of the robotic device 102, and so on.

Moreover, the cloud computing domain 100C further comprises a transformation apparatus 108 for parameter transformation between a robotic device 102 and the controller 106. In other variants, the transformation apparatus 108 may also be located in the wireless access domain 100B or in a core network associated with the wireless access domain 100B. The transformation apparatus 108 will in the following also be referred to simply as "apparatus" 108.

The apparatus 108 is configured to transform the real parameters received from the robotic device 102 to ideal parameters processable by the controller 106. As can be seen from FIG. 1, the apparatus 108 is logically arranged between the robot cell domain 100A and the controller 106, such that all command messages transmitted from the controller 106 to the robotic device 102 and all status messages transmitted from the robotic device 102 to the controller 106 can be intercepted and transformed by the transmission apparatus 108. That is, ideal parameters from the controller 106 to the robotic device 102 are transformed into real parameters, and real parameters transmitted from the robotic device 102 to the controller 106 are transformed into ideal parameters. For this purpose, the apparatus 108 uses a transformation between a parameter domain of the controller 106 (in the following referred to as "ideal parameter domain") and a parameter domain of the robotic device 102 (in the following referred to as "real parameter domain").

The cloud computing domain 100C further comprises a training module 110, in which the transformation between the ideal parameter domain and the real parameter domain is obtained. The training module 110 is depicted in FIG. 1 to be comprised in the cloud computing domain 100C. However, the training module 110 may alternatively be located remotely from the transformation apparatus 108 (e.g., in an different cloud computing domain).

In the training module 110, a machine learning algorithm, such as a deep neural network, is trained to generate and, if necessary, update the transformation. The transformation is transmitted from the training module 110 to the apparatus 108, as depicted by the dashed arrow in FIG. 1.

The transformation apparatus 108 depicted in the network system 100 of FIG. 1 offers the advantage that a possible deviation between the real parameter domain and the ideal parameter domain is adjusted during the signal transmission between the controller 106 and the robotic device 102. In other words, a possible command offset in parameters transmitted to the robotic device 102 and a possible status offset in parameters transmitted to the controller 106 can be adjusted, and this adjustment can occur in real time.

Figure 2B:
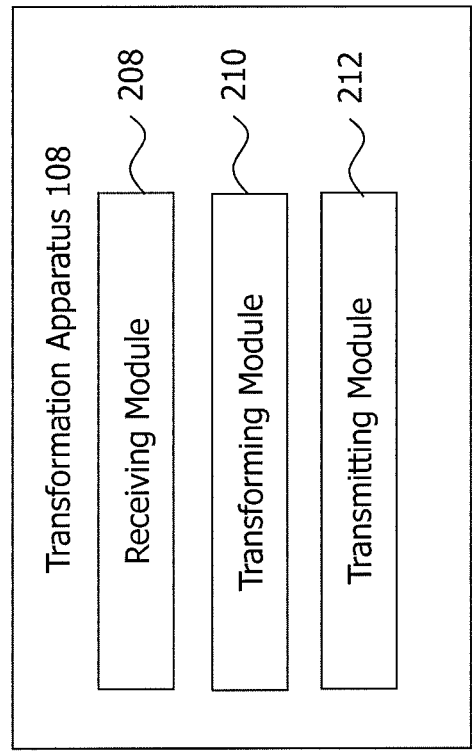
FIGS. 2A&2B illustrate embodiments of a transformation apparatus for parameter transformation between a robotic device and a controller for the robotic device according to the present disclosure.
Figure 2A:
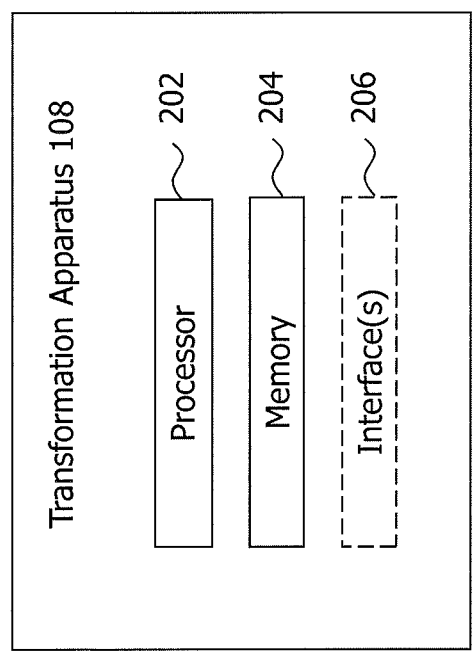

FIGS. 2A and 2B illustrate two embodiments of the transformation apparatus 108 as depicted in FIG. 1. In the embodiment illustrated in FIG. 2A, the apparatus 108 comprises a processor 202 and a memory 204 coupled to the processor 202. Further, the apparatus 108 comprises at least one interface 206 for communication with the wireless access domain 100B and the controller 106, respectively.

The processor 202 is generally configured to transform any received non-transformed parameters to transformed parameters and transmit the transformed parameters to the robotic device 102 and the controller 106, respectively. The transformation process will be explained in greater detail below with reference to FIGS. 4, 5A and 5B. The corresponding operations are performed by the processor 202 under control of program code stored in the memory 204.

In more detail, the apparatus 108 of FIG. 2A is configured to receive, via the interface 206, command messages generated by the controller 106, to process same by the processor and to forward the processed command messages, via the interface 206, to the robotic device 102 via the wireless access domain 100B. As mentioned above, these command messages comprise non-transformed ideal parameters. The apparatus 108 is further configured to receive, via the interface 106, status messages indicative of a current status of the robotic device 102. The status messages are received from the wireless access domain 100B and comprise non-transformed real parameters. The apparatus 108 of FIG. 2A is further configured to process the status messages by the processor 202 and to forward the processed status messages, via the interface 206, to the controller 106. As such, the apparatus 108 of FIG. 2A is configured to transmit, via the interface 206, command messages comprising transformed real parameters to the robotic device 102 and to transmit, via the interface 206, status messages comprising transformed ideal parameters to the controller 106.

FIG. 2B shows an embodiment in which the transformation apparatus 108 is implemented in a modular configuration. As shown in FIG. 2B, the apparatus 108 comprises a receiving module 208 configured to receive a non-transformed parameter from the robotic device 102 or the controller 106, as explained above. The apparatus 108 in the modular implementation of FIG. 2B further comprises a transforming module 210 configured to transform the non-transformed parameter to a transformed parameter. Moreover, the apparatus 108 in the modular implementation of FIG. 2B comprises a transmitting module 212 configured to transmit the transformed parameter to the controller 106 or the robotic device 102, respectively.

Figure 3:
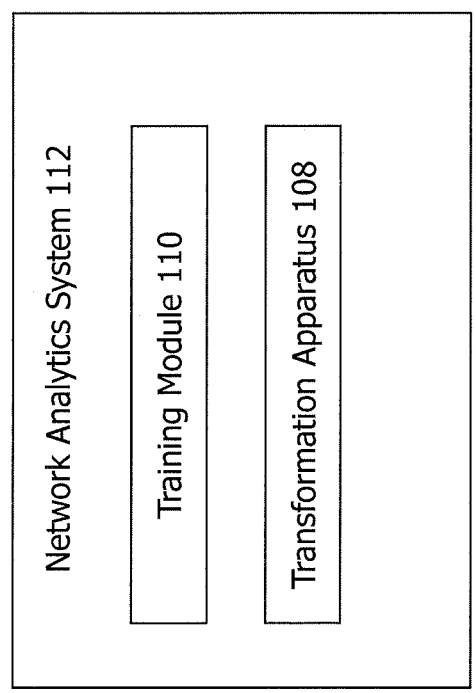
FIG. 3 illustrates an embodiment of a network analytics system comprising a training module and a transformation apparatus according to the present disclosure.

FIG. 3 illustrates an embodiment of a network analytics system 112 implemented in a modular configuration. The network analytics system 112 comprises the transformation apparatus 108 and the training module 110. The network analytics system 112 may be implemented in the cloud computing domain 100C, in the wireless access domain 100B (including the associated core network) or in a distributed manner between these two domains 100B, 100C.

The purpose of the network analytics system 112 is to ensure a specific quality of service (QoS), or quality of control (QoC), in regard of the robot cell domain 100A. Therefore, the network analytics system 112 is configured to monitor the operation of the robotic devices 102 and to perform specific actions if a decrease in QoS or QoC of the robotic device 102 is detected. Such actions may include triggering the training module 110 to update the transformation applied by the transformation apparatus 108 or to generate a new transformation. Of course, the training module 110 will initially generate a transformation regardless of the any QoS or QoC.

In the training module 110 illustrated in FIGS. 1 and 3, a machine learning algorithm is trained to obtain a transformation between an ideal parameter domain of the controller 106 and areal parameter domain of the robotic device 102. The machine learning algorithm receives input data for deriving the transformation. These input data include a previously obtained transformation and/or a deviation between a real parameter and an associated ideal parameter. As an example, the machine learning algorithm is able to recall former transformations and/or real and ideal parameters which have been transformed. The machine learning algorithm is further able to compare the received non-transformed parameter to a previously received non-transformed parameter and obtain the transformation based on the comparison. In one example, the real position (in arbitrary units) of the robotic device 102 may have changed from (0.1; 0.1; 0.1) to (0.2; 0.2; 0.2). In this case, the machine learning algorithm may output a specific transformation formerly used in a similar case, e.g., when the real position of the robotic device 102 has changed from (0; 0; 0) to (0.1; 0.1; 0.1). In other words, in both exemplary cases the position of the robotic device 102 differs from the former position by 0.1 in all three dimensions, and the machine learning algorithm outputs a transformation corresponding to said difference. In another example, the controller 106 may instruct the robotic device 102 to change its ideal velocity (in arbitrary units) from (1; 2; 5) to (0.1; 0.2; 0.5). In this case, the velocity of the robotic device 102 has been lowered by factor 10 in all three dimensions. The machine learning algorithm may output a specific transformation formerly used in the same case, e.g., when the velocity of the robotic device 102 has been lowered from (10; 10; 10) to (1; 1; 1). The training module 110 transmits the outputted transformation to the apparatus 108.

As a further example, the machine learning algorithm may also be trained with former transformations which are weighted with different weighting factors. For example, the real position (in arbitrary units) of the robotic device 102 may have changed from (0.1; 0.1; 0.1) to (0.2; 0.2; 0.2), as in the above example. However, in this case, the machine learning algorithm may output a transformation determined from three different formerly used transformations, which are also weighted differently. The first transformation may be the one used in the case when the real position (in arbitrary units) of the robotic device 102 has changed from (0; 0; 0) to (0.1; 0.1; 0.1). Said transformation may be weighted with a first weighting factor such as 0.5. The second transformation may be the one used in the case when the real position (in arbitrary units) of the robotic device 102 has changed from (0; 0; 0) to (0.2; 0.2; 0.2). Said transformation may be weighted with a second weighting factor such as 0.2. The third transformation may be the one used in the case when the real position (in arbitrary units) of the robotic device 102 has changed from (0.1; 0.1; 0.1) to (0.15; 0.15; 0.15). Said transformation may be weighted with a third weighting factor such as 0.3.

The weighting factors may be derived based on different criteria. For example, the greater a time difference between a previously obtained transformation and/or a deviation between a real parameter and an associated ideal parameter used to train the machine learning algorithm (for simplicity referred to as "the training sample") and the last obtained transformation and/or the last deviation between a real parameter and an associated ideal parameter (for simplicity referred to as "the actual sample"), the lower the weighting factor of the training sample may be. As a further example, the smaller a mathematical difference between the training sample and the actual sample, the higher the weighting factor may be. Moreover, if a training sample and the actual sample are the same, the weighting factor of said training sample may be the highest of all weighting factors (e.g., 0.99 or 0.9).

As the amount of input data for training the machine learning algorithm increases with every training step, a difference between a transformation obtained by the machine learning between a real parameter and an associated ideal parameter and an actual deviation between said parameters may decrease with every training step. In other words, the precision of the machine learning algorithm may increase with every training step. Moreover, the machine learning algorithm may not necessarily provide an optimal parameter transformation for every single data transmission between the robotic device 102 and the controller 106, but may instead provide an optimal overall precision (i.e., optimizing the parameter transformation for many data transmissions as a whole).

Figure 4:
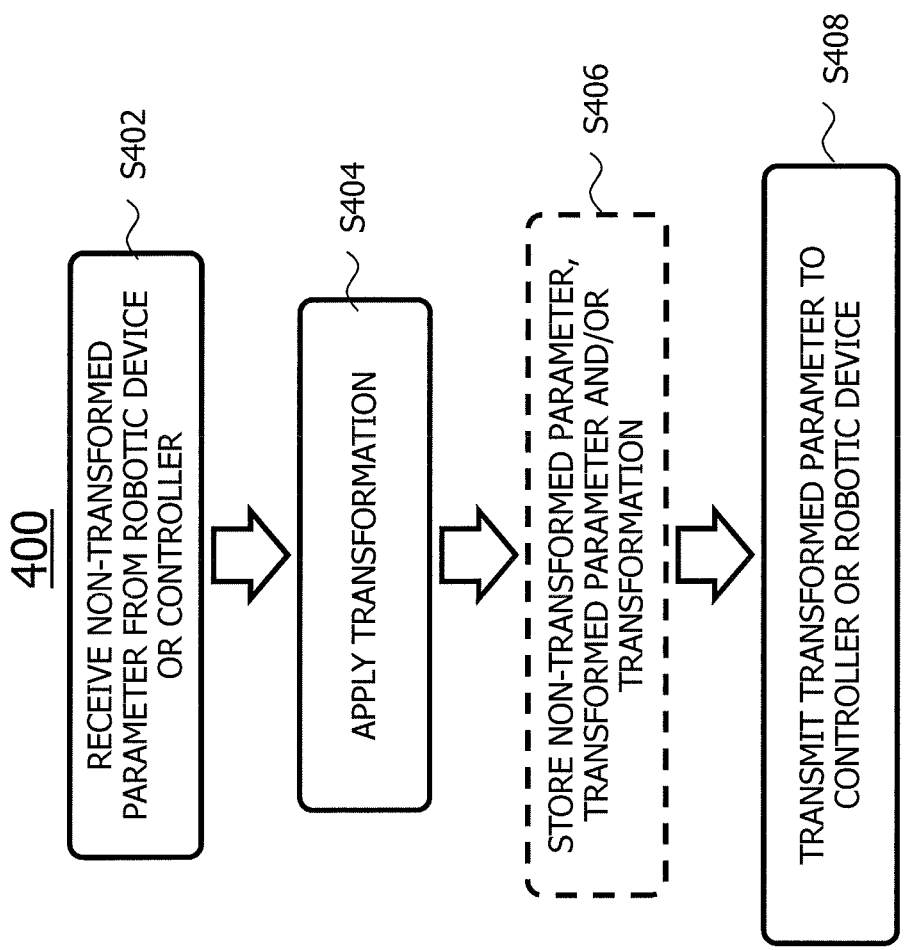
FIG. 4 illustrates a method embodiment of the present disclosure.

FIG. 4 illustrates in a flow diagram 400 a method embodiment performed by the transformation apparatus 108 as discussed above with reference to FIGS. 1 to 3.

The method starts in step S402 with the apparatus 108 receiving, via the receiving module 208 or the interface 206, a non-transformed parameter from either the robotic device 102 or the controller 106. The received non-transformed parameter is one of a real parameter contained in a status message from the robotic device 102 and an ideal parameter contained in a command message from the controller 106, as described above with reference to FIGS. 1, 2A and 2B.

Transforming the received non-transformed parameter to a transformed parameter is done in further step S404. For this purpose, a transformation between an ideal parameter domain of the controller 106 and a real parameter domain of the robotic device 102 is used. The transformation is done by the transforming module 210 or the processor 204 of the apparatus 108. The transformation step S404 will be explained in more detail below with reference to FIGS. 5A and 5B below.

Optionally, the method may comprise the step S406 (depicted in dashed lines) of storing at least one non-transformed parameter, at least one associated transformed parameter and a corresponding transformation. The stored parameters and/or stored transformation may be used to train the machine learning algorithm, e.g. in the training module 110, to obtain subsequent transformations.

As indicated in step S408, the method continues with transmitting, by the transmitting module 212 or the interface 206, the transformed parameter to either the controller 106 (when the non-transformed parameter is received from the robotic device 102) or the robotic device 102 (when the non-transformed parameter is received from the controller 106).

Figure 5A:
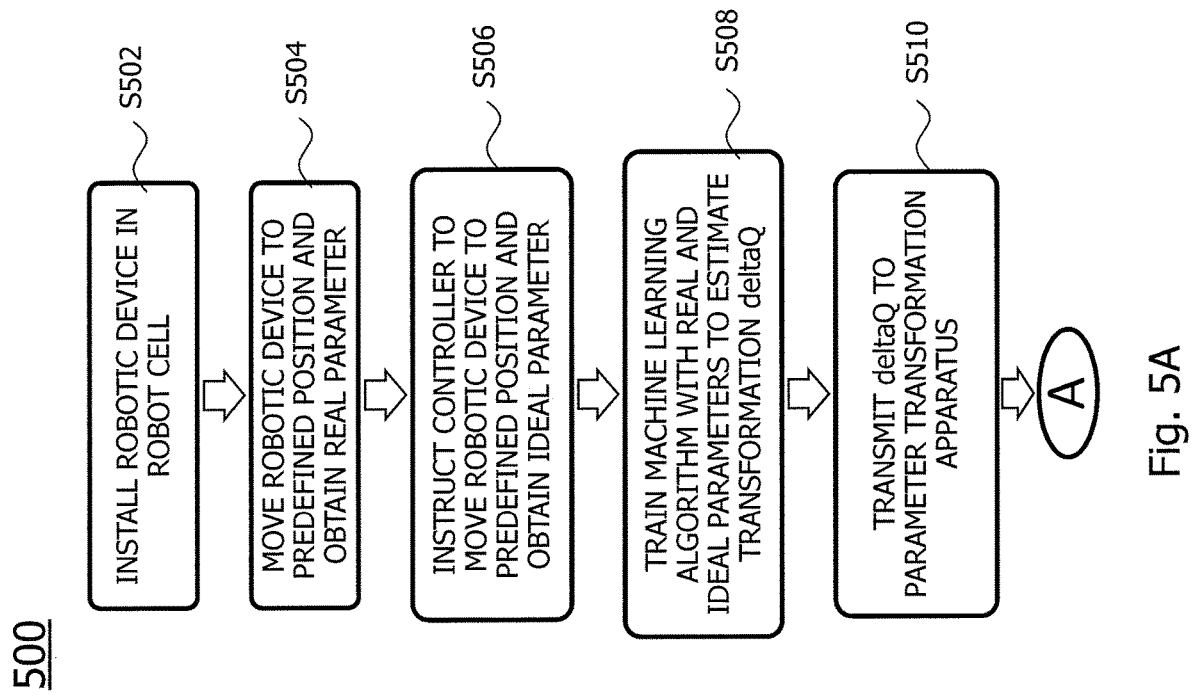
FIGS. 5A&5B illustrate a further method embodiment of the present disclosure.
Figure 5B:
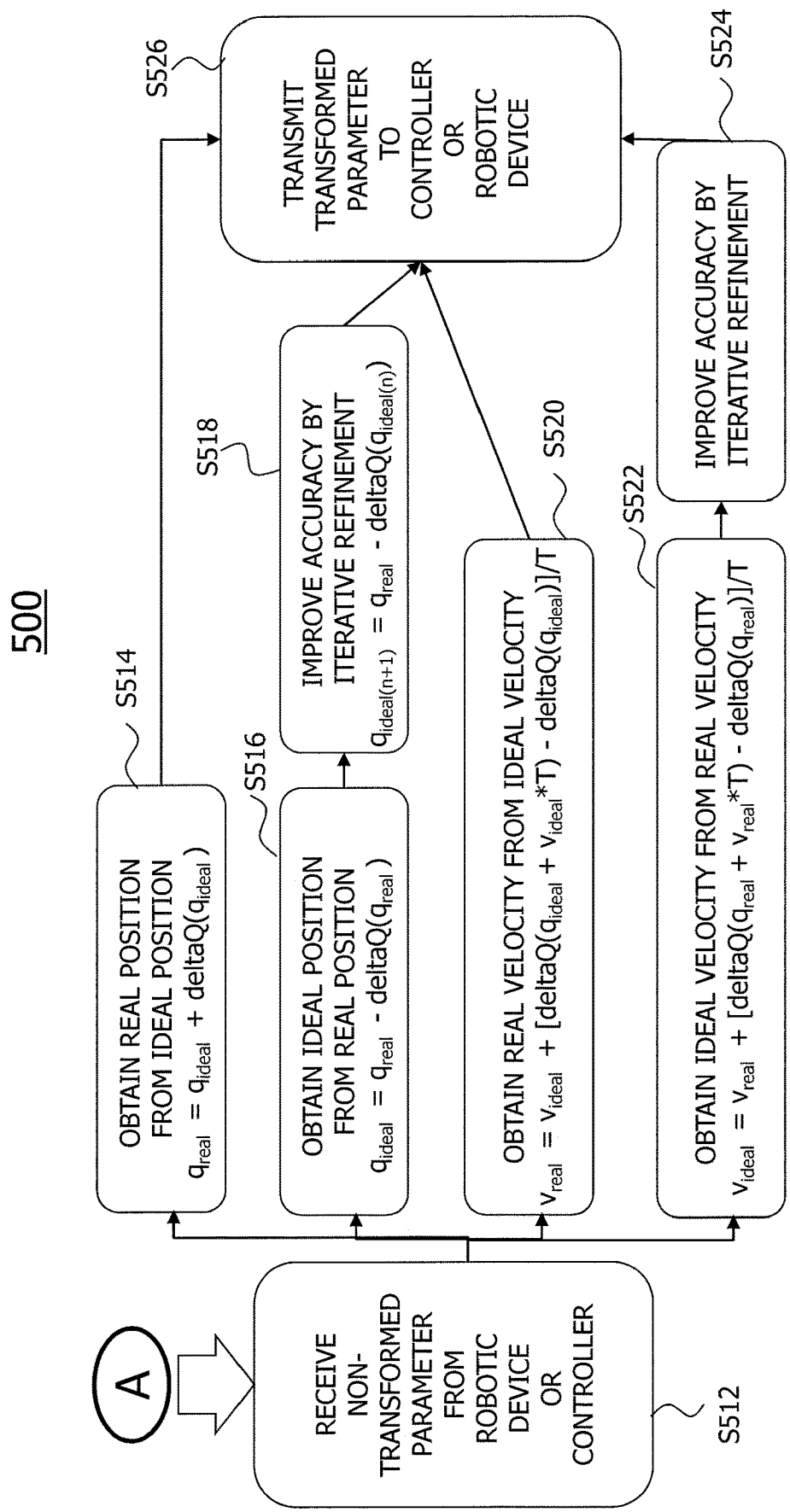

In a flow diagram 500 depicted in FIGS. 5A and 5B, a more detailed method embodiment for training the machine learning algorithm and obtaining a transformation is described. The method embodiment of FIGS. 5A and 5B may be performed in the context of the method embodiment illustrated in FIG. 4.

The method starts with step S502 in FIG. 5A, wherein at least one robotic device 102 is installed in the robot cell 101 (see FIG. 1). That is, the robotic device 102 is accurately positioned inside the robot cell 101 such that the robotic device 102 is able to perform a specific task.

In step S504, an initial real parameter for training the machine learning algorithm by the training module 110 is derived. For this purpose, the robotic device 102 (i.e., a reference point of a tool center of the robotic device 102) is moved to a predefined position. For example, when the robotic device 102 is calibrated to work on a plane surface such as a table, the predefined position may be an edge of an upper surface of the table, represented by the positional coordinates (0; 0; 0) in a real coordinate system as used in the robot cell domain 100A. For the sake of simplicity, only three-dimensional parameters are used herein. However, also six-dimensional parameters consisting of three position coordinates and three angular coordinates may be used.

An initial ideal parameter for training the machine learning algorithm is derived in step S506. To this end, the controller 106 is instructed (e.g., by a user or a calibration program) to move the robotic device 102 to the same predefined position as in step S504 and use the corresponding position coordinates as reference coordinates for an ideal coordinate system used to control the robotic device 102. As described above, the ideal parameters used by the controller 106 may deviate from the real parameters used by the robotic device 102. Again, the initial ideal parameters may be either three-dimensional parameters or six-dimensional parameters.

Based on multiple pairs of initial real parameters and associated ideal parameters derived in steps S504 and S506, the machine learning algorithm is trained by the training module 110 to output a transformation (e.g., a position correction function deltaQ) in step S508. In the following, the position correction function deltaQ is used as an example for explaining the transformation. However, it is to be understood that the presented technique is not limited to a position correction function and could, for example, equally be used to generate a velocity correction function or any other correction function.

In step S510, the position correction function deltaQ is transmitted from the training module 110 to the transformation apparatus 108. The position correction function deltaQ may then be used by the apparatus 108 as a transformation for any non-transformed parameters as generated by the controller 106 or the robotic device 102.

In step S512, depicted in FIG. 5B, the apparatus 108 receives a non-transformed parameter from the robotic device 102 or the controller 106. As described above, the non-transformed parameter may be one of a real parameter received in a status message from the robotic device 102 or an ideal parameter received in a command message from the controller 106. Accordingly, the received non-transformed parameter may be one of an ideal position or an ideal velocity transmitted to the robotic device 102 or a real position or a real velocity transmitted from the robotic device 102. Based on the received non-transformed parameter, a corresponding transformed parameter is derived by the apparatus 108 using the position correction function deltaQ. The respective transformations are performed in steps S514 to S520 of FIG. 5B.

In case the received non-transformed parameter is an ideal position as processable by (e.g., as generated by) the controller 106, the ideal position is transformed to a real position of the robotic device 102 is in step S514 using the position correction function deltaQ. The transformation may have the exemplary form $$q_{real}=q_{ideal}+\text{deltaQ}(q_{ideal}).$$

Herein, $q_{real}$ indicates a real position (either three-dimensional or six-dimensional) measurable at the robotic device 102, $q_{ideal}$ indicates an ideal position (either three-dimensional or six-dimensional) processable by the controller and deltaQ indicates the position correction function. As is apparent from the above formula, the transformation (i.e., the position correction function deltaQ) is representative of an adjustment of a deviation between the real position $q_{real}$ and the ideal position $q_{ideal}$.

Given the case that the received non-transformed parameter is a real position $q_{real}$ measurable (e.g., as actually measured) at the robotic device 102, an ideal position $q_{ideal}$ processable by the controller 106 (e.g., in a feedback loop or for inverse kinematics) is obtained in step S516 using the following example transformation:

$$q_{ideal}=q_{real}-\text{deltaQ}(q_{real}).$$

In case a real position is transformed into an ideal position, the accuracy of the transformation can be improved by iterative refinement, as depicted in step S518. In other words, the transformation is repeated several times, wherein during every iteration step the following example transformation is applied $$q_{ideal(n+1)}=q_{real}-\text{deltaQ}(q_{ideal(n)}).$$

Herein, a $q_{ideal(n+1)}$ denotes an ideal position obtained in the n+1$^{st}$ iteration step and $q_{ideal(n)}$ denotes an ideal position obtained in the n$^{th}$ iteration step. $q_{real}$ and deltaQ denominate the same parameters as used in steps S514 and S516.

A real velocity $v_{real}$ (either three-dimensional or six-dimensional) measurable by the robotic device 102 is obtained in step S520 using the following example transformation:

$$v_{real}=v_{ideal}[\text{deltaQ}(q_{ideal}+v_{ideal}*T)-\text{deltaQ}(q_{ideal})]/T.$$

Herein, T denotes an update time of the controller 106, such as the time between two consecutive command messages (e.g., as received from the controller 106 at the transformation apparatus 108). Said update time T may thus be measured by the apparatus 108 or may alternatively be obtained as additional information in the command messages received from the controller 106. Further, $q_{ideal}$ denotes an ideal position and $v_{ideal}$ denotes an ideal velocity. $q_{ideal}$ and $v_{ideal}$ may either be received from the controller 106 in a command message or may be previously stored in the memory 204 of the apparatus according to step S406.

In step S522, an ideal velocity $v_{ideal}$ (either three-dimensional or six-dimensional) processable by the controller 106 is obtained with respect to a real position $q_{real}$ and a real velocity $v_{real}$, as well as an update time T of the controller 106, as defined above with reference to step S520. Similar to step S520, $q_{real}$ and $v_{real}$ may either be received from the robotic device 102 in a status message or may be previously stored in the memory 204 of the apparatus according to step S406. For example, the following transformation may be used $$v_{ideal}=v_{real}+[\text{deltaQ}(q_{real}+v_{real}*T)-\text{deltaQ}(q_{real})]/T.$$

Similar to step S518, the accuracy of the transformation between a real position $v_{real}$ and an ideal position $v_{ideal}$ may be improved in step S524 by iterative refinement.

After the transformations according to the steps S514 to S524 have been performed, the corresponding transformed parameters are transmitted to the controller 106 or the robotic device 102, respectively, in step S526. In particular, a transformed ideal position $q_{ideal}$ and a transformed ideal velocity $v_{ideal}$ are transmitted to the controller 106 and a transformed real position $q_{real}$ and a transformed real velocity $v_{real}$ are transmitted to the robotic device 102.

The transformation technique presented herein may be used in a variety of different applications, preferably in scenarios requiring a frequent reconfiguration of the robotic device 102 (e.g., in factories where the robotic device 102 has to perform multiple tasks over a short period of time such as days or weeks). For example, the reconfiguration may be required for producing different products or for a cooperative collaboration between different robotic devices. The required reconfiguration of the robotic device 102 may comprise a change in a movement path performed by the robotic device 102 (e.g., for producing different products), a change in a degree of precision of a movement path performed by the robotic device 102 (e.g., for reducing the failure rate of the robotic device 102) and/or a change in a location of the robotic device 102 (e.g., when working cooperatively with other robotic devices on the same product). In each of these cases, the transformation may be updated by the training module 110 responsive to the reconfiguration.

As has become apparent from the above description of exemplary embodiments, the technique proposed herein helps to accelerate reconfiguration procedures of robotic devices 102. As a machine learning algorithm may specifically be trained in response to every reconfiguration, a suitable transformation between an ideal parameter domain and a real parameter domain can be outputted faster (e.g., in real time) and more reliable after every reconfiguration process. Therefore, the required reconfiguration time is constantly reduced while at the same time the precision of the calibration process is increased. Moreover, as the presented technique also corrects a possible deviation between real parameters and ideal parameters, neither the configuration of the robotic device nor the configuration of the robot controller has to be adjusted manually during operation of the robotic devices 102.

It will be appreciated that the present disclosure has been described on the basis of exemplary embodiments and can be modified in many ways. As such, the invention is intended to be limited only by the claims appended hereto.

The invention claimed is:

1. A network analytics system comprising an apparatus for parameter transformation between a robotic device and a controller for the robotic device, the apparatus being configured to:
receive at least one non-transformed parameter indicative of at least one of a position and a velocity of or for the robotic device, wherein the non-transformed parameter is received from the robotic device or the controller, respectively;
transform the received non-transformed parameter to a transformed parameter using a transformation between an ideal parameter domain of the controller and a real parameter domain of the robotic device, the ideal parameter domain including ideal parameters processable by the controller and the real parameter domain including real parameters measurable at the robotic device and capable of deviating from the associated ideal parameters;
transmit the transformed parameter to the other one of the robotic device and the controller;
monitor operational performance of the robotic device for decreased performance; and
when decreased performance is detected, obtain a new transformation from a machine learning algorithm.

2. The network analytics system of claim 1, wherein an input for training the machine learning algorithm to obtain the transformation is at least one of a transformation previously obtained from the machine learning algorithm and a deviation between a real parameter and an associated ideal parameter.

3. The network analytics system of claim 1, wherein an initial real parameter for training the machine learning algorithm is derived by moving the robotic device to a predefined position and wherein an initial ideal parameter for training the machine learning algorithm is derived by instructing the controller to move the robotic device to the same predefined position.

4. The network analytics system of claim 1, wherein the transformation is representative of an adjustment of a deviation between a real parameter and an associated ideal parameter.

5. The network analytics system of claim 4, wherein the transformation is configured to adjust at least one of a deviation between an ideal position and an associated real position and a deviation between an ideal velocity and a real velocity.

6. The network analytics system of claim 4, wherein the transformation depends on at least one of an ideal parameter, a real parameter and an update time of the controller.

7. The network analytics system of claim 1, wherein the received non-transformed parameter is one of a real parameter received from the robotic device and an ideal parameter received from the controller.

8. The network analytics system of claim 1, wherein the transmitted transformed parameter is one of a real parameter transmitted to the robotic device and an ideal parameter transmitted to the controller.

9. The network analytics system of claim 1, wherein the non-transformed parameter is contained in one of a command message for the robotic device received from the controller and a status message for the controller received from the robotic device.

10. The network analytics system of claim 1, wherein the transformed parameter is contained in one of a command message transmitted to the robotic device from the controller and a status message transmitted to the controller from the robotic device.

11. The network analytics system of claim 1, wherein the transformation is configured to be updated responsive to a reconfiguration of the robotic device.

12. The network analytics system of claim 11, wherein the reconfiguration comprises at least one of:
a change in a movement path performed by the robotic device;
a change in a degree of precision of a movement path performed by the robotic device; and
a change in a location of the robotic device.

13. The network analytics system of claim 1, further comprising a computing cloud-based training module for the machine learning algorithm.

14. The network analytics system of claim 13, configured to train the machine learning algorithm in the cloud-based training module.

15. The network analytics system of claim 13, configured to transmit the transformation from the computing cloud-based training module to the apparatus.

16. A method for parameter transformation between a robotic device and a controller for the robotic device, the method comprising the steps of:
- receiving at least one non-transformed parameter indicative of at least one of a position and a velocity of or for the robotic device, wherein the non-transformed parameter is received from the robotic device or the controller, respectively;
- transforming the received non-transformed parameter to a transformed parameter using a transformation between an ideal parameter domain of the controller and a real parameter domain of the robotic device, the ideal parameter domain including ideal parameters processable by the controller and the real parameter domain including real parameters measurable at the robotic device and capable of deviating from the associated ideal parameters;
- transmitting the transformed parameter to the other one of the robotic device and the controller;
- monitoring operational performance of the robotic device for decreased performance; and
- when decreased performance is detected, obtaining a new transformation from a machine learning algorithm.

17. The method according to claim 16, further comprising the step of storing at least one non-transformed parameter, at least one associated transformed parameter and a corresponding transformation.

* * * * *